(12) United States Patent
Iwase et al.

(10) Patent No.: US 7,469,579 B2
(45) Date of Patent: Dec. 30, 2008

(54) APPARATUS FOR MEASURING A SHAPE OF A TIRE

(75) Inventors: Masanori Iwase, Osaka-fu (JP);
Shigeru Minakami, Kanagawa-ken (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 17 days.

(21) Appl. No.: 11/767,765

(22) Filed: Jun. 25, 2007

(65) Prior Publication Data
US 2007/0295071 A1    Dec. 27, 2007

(30) Foreign Application Priority Data
Jun. 26, 2006    (JP)    ............... 2006-175345

(51) Int. Cl.
*G01M 17/02*    (2006.01)
(52) U.S. Cl. ...................................... 73/146
(58) Field of Classification Search ........ 73/146–146.8; 340/442–447
See application file for complete search history.

(56) References Cited

U.S. PATENT DOCUMENTS

| | | | |
|---|---|---|---|
| 5,987,978 A * | 11/1999 | Whitehead | .................. 73/146 |
| 6,609,417 B1 * | 8/2003 | Cantu et al. | .................... 73/146 |
| 6,789,416 B1 * | 9/2004 | Tracy et al. | .................... 73/146 |
| 6,802,130 B2 * | 10/2004 | Podbielski et al. | ............ 33/288 |
| 7,269,997 B2 * | 9/2007 | Dale et al. | ..................... 73/146 |
| 7,295,328 B2 | 11/2007 | Uehara | |
| 7,391,306 B2 * | 6/2008 | Dufournier | ................. 340/442 |

FOREIGN PATENT DOCUMENTS

| JP | 3581876 | 8/2004 |
|---|---|---|
| JP | 2005-077371 | 3/2005 |
| WO | WO 00/42409 | 7/2000 |

* cited by examiner

*Primary Examiner*—Andre J Allen
*Assistant Examiner*—Jermaine Jenkins
(74) *Attorney, Agent, or Firm*—Fish & Richardson P.C.

(57) ABSTRACT

The apparatus for measuring a shape of a tire comprising a scanning part 6 provided with an optical sensor 11 that can measure the distance to the tire tread and a driving part in which the optical sensor 11 can scan in the tire width direction, the supporting portions of the scanning part 1a and 1b that support scanning part 6, a contact plate 2 provided at one end of the supporting portions of the scanning part 1a and 1b, and a contact plate 3 provided at the other end of the supporting portions of the scanning part 1a and 1b and movable in the scanning direction, wherein the scanning part 6 is detachable to the supporting portions of the scanning part 1a and 1b.

12 Claims, 5 Drawing Sheets

[FIG.1]
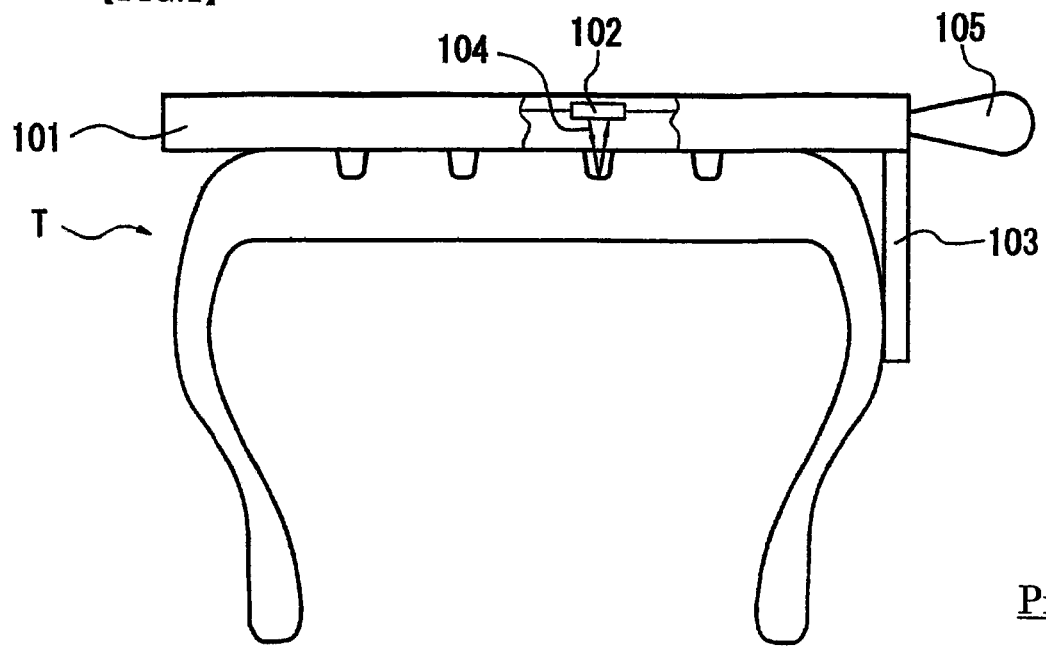
Prior Art
[FIG.2]
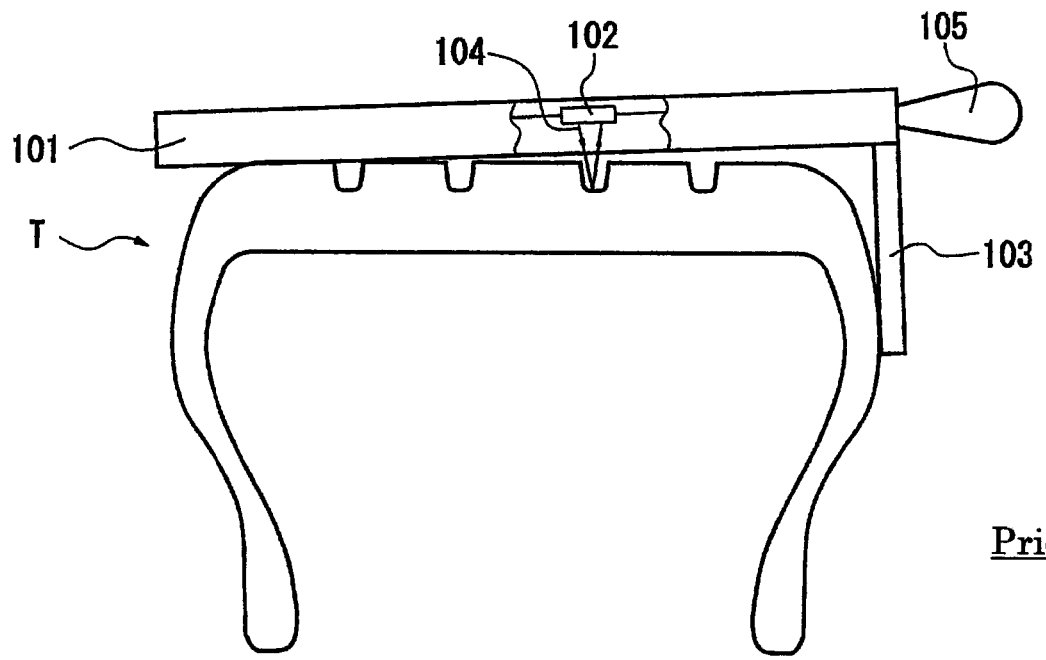
Prior Art

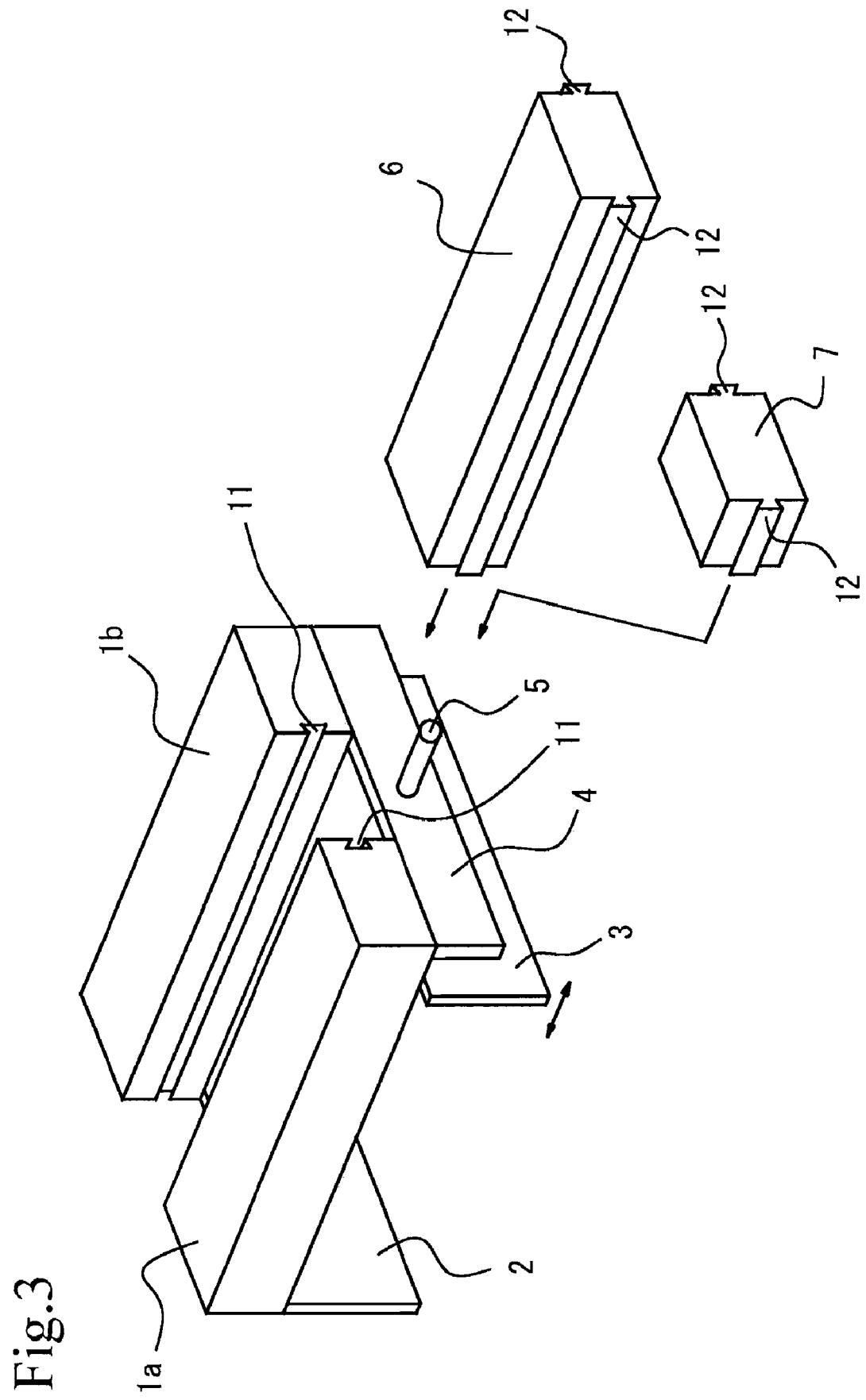

[FIG.4]
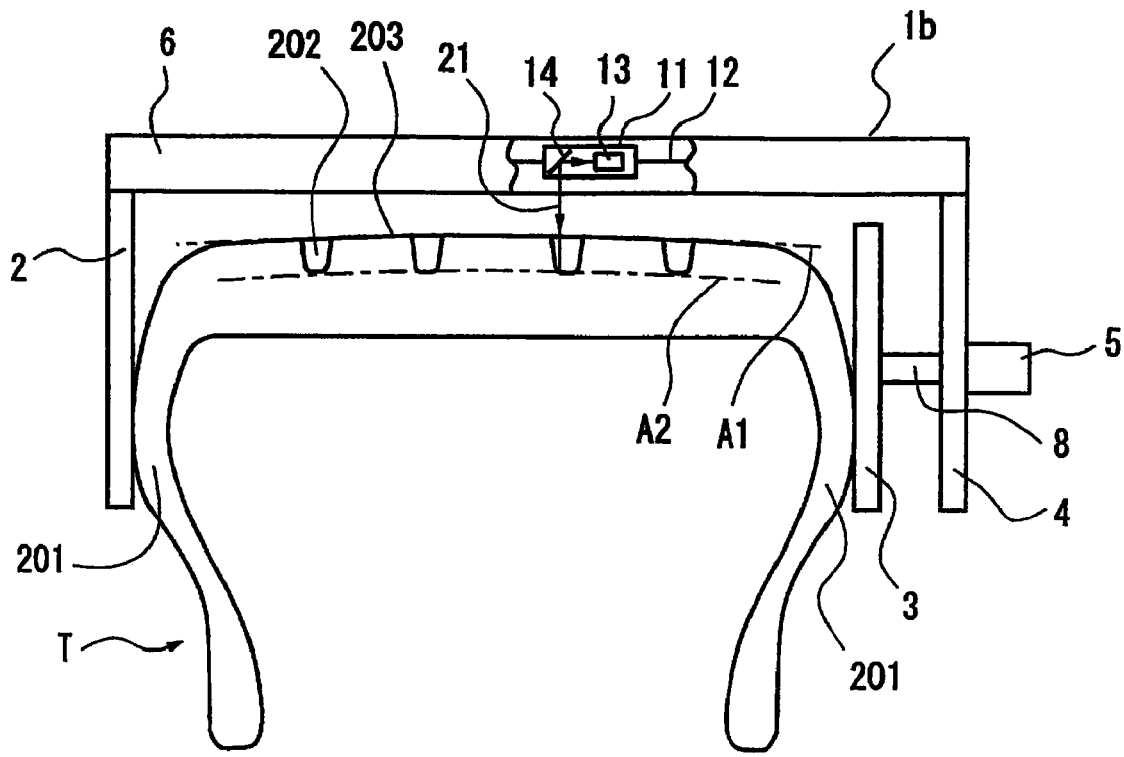
[FIG.5]
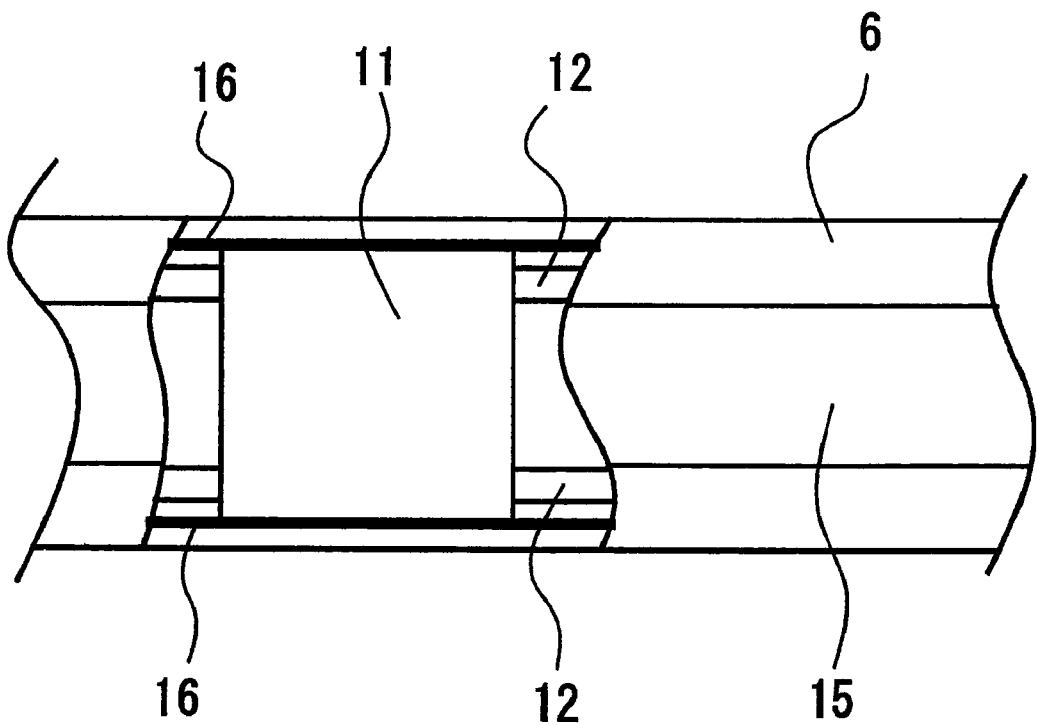

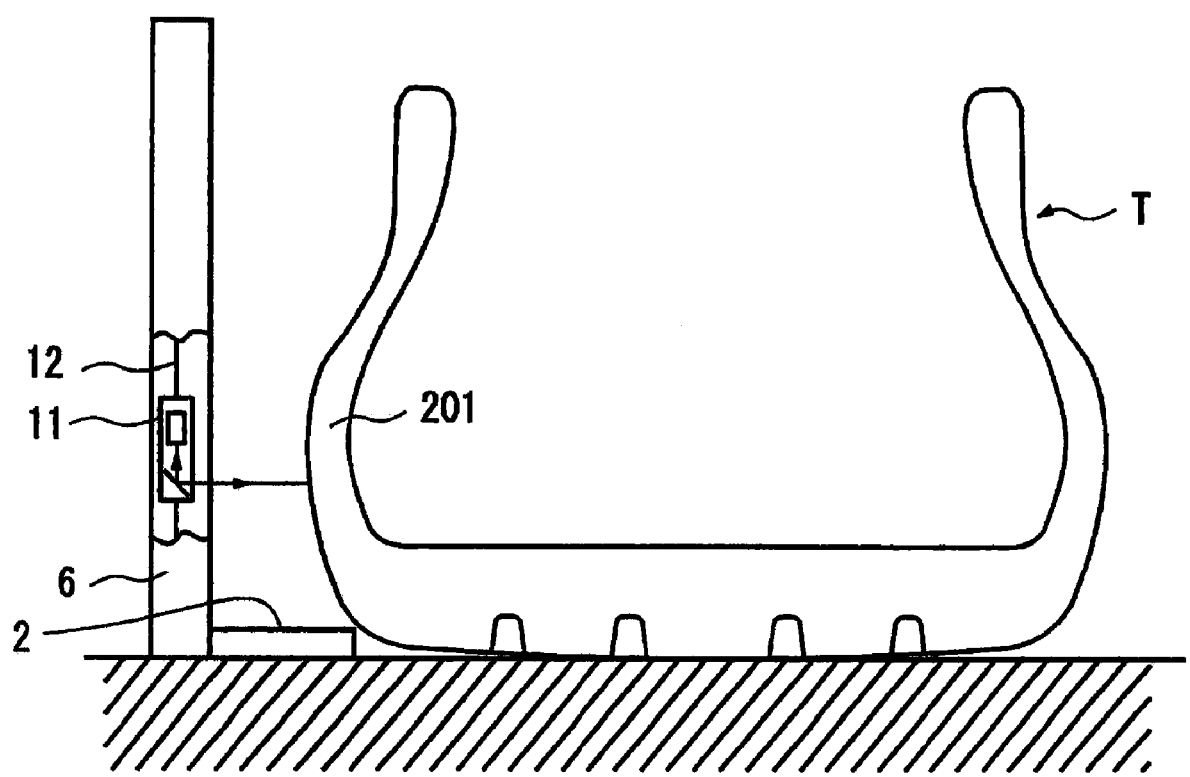

[FIG.7]
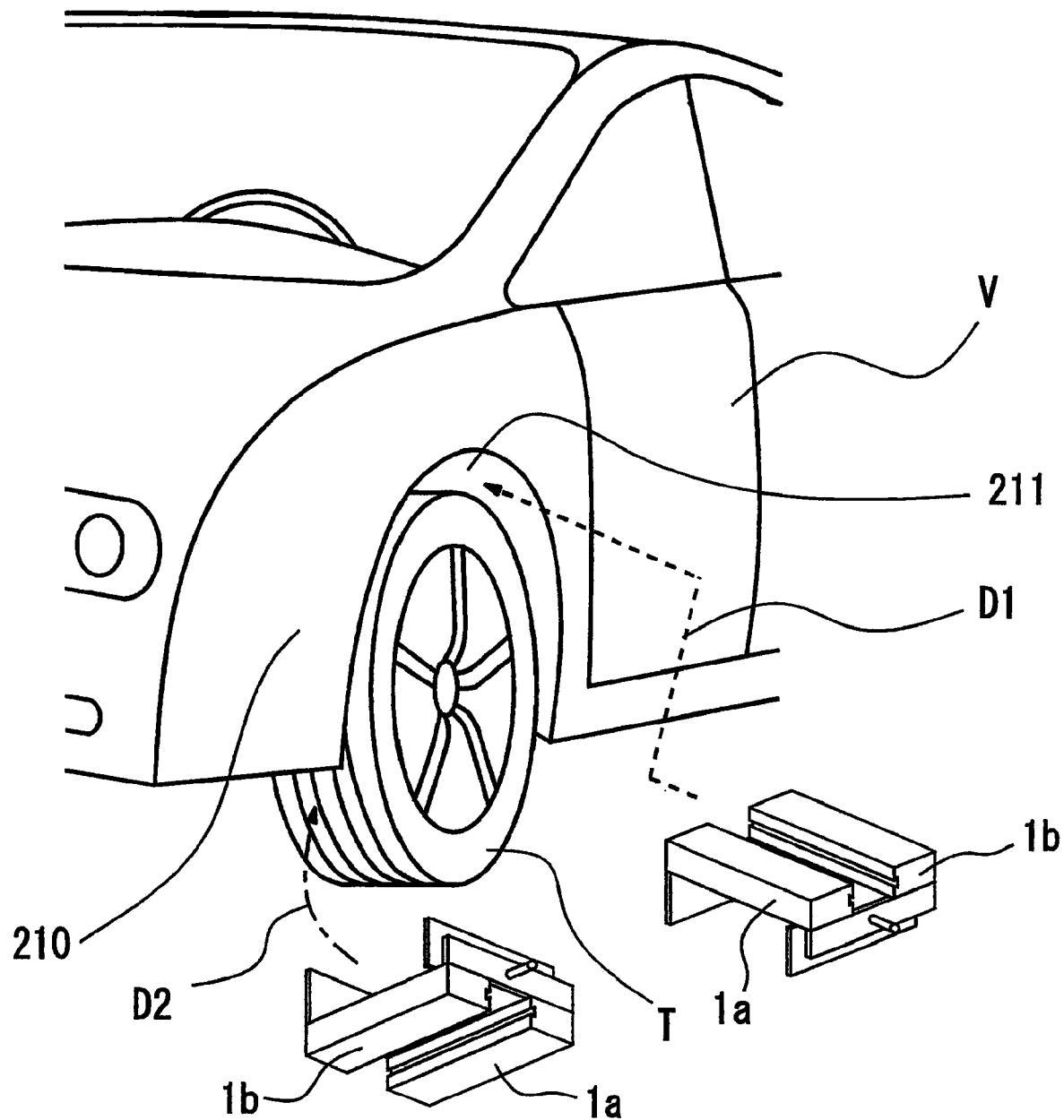

APPARATUS FOR MEASURING A SHAPE OF A TIRE

The description of this application claims benefit of priority based on Japanese Patent Application No. 2006-175345, the entire same contents of which are incorporated by reference herein.

BACKGROUND OF THE INVENTION

1. Field of the Invention

The present invention relates to a method and an apparatus for measuring a shape of a tire, and it relates to an apparatus for measuring a cross-sectional shape of a tread or of a sidewall of the tire with a tire installed on a vehicle.

2. Description of the Prior Art

It has been important to take hold of the state of tire wear and the progress of the wear has been taken hold of by depth gauge by measuring the depth of a groove formed on a tread. When one wants to know the cross-sectional shape of the tread as well as the depth of the groove, such a method has been employed as making a plaster cast of the tire tread and measuring the cross-sectional shape of the hardened plaster. This method has enabled us to take hold of the state of the tire wear in more detail including the state of uneven wear. However, since it takes time for the plaster to harden, the state could not be measured efficiently by the above mentioned method.

In order to shorten the time for measurement, apparatus that measures the shape of the tread by scanning an optical sensor by laser light in the tire width direction has been known (Patent Document 1: Examined Japanese Patent No. 3581876, pages 5 to 7, FIGS. 1 and 2). As shown in FIG. 1, in this apparatus, a housing 101 provided with an optical sensor 102 that can scan in the tire width direction contacts with a tread of a tire T, a bracket 103 fixed at one end of the housing 101 contacts with a side-wall of the tire T, a person who measures holds a handle 105 by hand, and the housing 101 is fixed. By scanning the optical sensor 102 in the width direction of the tire T and by measuring the distance to the tread, the shape of said tread is measured.

However, in the measuring apparatus disclosed in the patent document 1, as shown in FIG. 2, sometimes fixation is made in a state of positional deviation and not parallel to the rotational axis of the tire T. This tendency gets remarkable particularly when any of the shoulder portions of the tire T is in a state of uneven wear. Thus, measurement precision was degraded sometimes or measurement could not be made since the laser light 104 from the optical sensor 102 failed to reach the groove bottom.

Since the housing 101 contacts with the tread, raindrops or foreign materials adhere to or invade in the measuring apparatus sometimes causing the apparatus to fail. Further, since a person who measures holds the handle 105 by hand, due to shaking, measuring precision is sometimes degraded.

In the state where the housing 101 contacts with the tread, the precise position to be scanned by the laser light 104 of the optical sensor 102 becomes unknown. Therefore, when scanned by the laser light 104 along with the transverse groove, the shape of the tread of the portion cannot be measured, which in turns requires the positional change of the housing 101 to be measured again, causing to take more measuring time.

Therefore, the object of the present invention is to eliminate any factors that would degrade measuring precision or cause measuring incapability and to provide an apparatus capable of measuring the cross-sectional shape of the tire installed on a vehicle.

SUMMARY OF THE INVENTION

In order to solve the above mentioned problems, the present invention relates to an apparatus for measuring a shape of a tire comprising a scanning part provided with an optical sensor that can measure the distance to the tire tread and a driving part which can scan said optical sensor in the tire width direction, supporting portions of the scanning part that support said scanning part, a contact plate provided at one end of said supporting portion of the scanning part, and a contact plate provided at the other end of said supporting portion of the scanning part and movable in said scanning direction, wherein said scanning part is detachable to the supporting portion of the scanning part.

First, since one of the contact plates is movable, the scanning part is supported upward of the tire tread by two contact plates' sandwiching both side parts of the tire to be measured and by attaching the scanning part to the supporting portions of the scanning part. Then, scanned by the optical sensor in the tire width direction, the tire shape can be measured.

Further, since a person who measures does not have to hold the handle by hand during the measurement, there is no concern for degradation of the measurement precision by shaking. Since the scanning part does not contact with the tread, no failure occurs caused by raindrops or foreign materials adhered to the tread. Further, the positional deviation of the scanning part as mentioned above can be prevented.

The present invention relates to an apparatus for measuring a shape of a tire further provided with a detachable scanning part for positioning at said supporting portions of the scanning part.

Attaching a scanning part for positioning that irradiates laser at the same position as the trajectory scanned by the optical sensor of the scanning part before attaching the scanning part enables to precisely take hold of the measurement position. Also, the position of the supporting portions of the scanning part can be finely adjusted so that the traverse grooves of the tire should not be scanned.

The present invention also relates to an apparatus for measuring a shape of a tire, wherein said optical sensor includes a laser distance measuring apparatus and a mirror, the direction of the incident and exit laser light of the laser distance measuring apparatus is parallel to the tire tread to be measured, and said laser light is refracted by said mirror to be vertical to said tread.

By making the direction of the incident and exit laser light of the laser distance measuring apparatus parallel to the tread and by bending it vertical to the tread by the mirror, the scanning part can be thin and therefore, the apparatus can be inserted even in a narrow space between the fender and the tire of the vehicle.

The present invention also relates to an apparatus for measuring a shape of a tire, wherein said optical sensor includes a line laser shape sensor and a mirror, the direction of the incident and exit line laser light of said line laser shape sensor is parallel to the tire tread to be measured, and said line laser light is refracted by said mirror to be vertical to said tread.

Instead of the laser distance measuring apparatus, the line laser shape sensor can also be used. In this case, the direction of the incident and exit line laser light of said line laser shape sensor is made parallel to the tread and is refracted vertical to the tread by the mirror and the line laser light parallel to the tire circumferential direction is irradiated. The two-dimensional shape of the length corresponding to the line laser light is measured and by scanning the line laser shape sensor in the tire width direction, the three-dimensional shape of the tread can be measured.

The present invention relates to an apparatus for measuring a shape of a tire further provided with communication means that can transmit the positional data of said optical sensor and the data of the distance to the tire surface.

Provided with communication means that can transmit the positional data of said optical sensor and the data of the distance to the tire surface, transmitted data can be processed by a computer. For example, by calculating a virtual circular arc approximating the surface of the tread and calculating a virtual circular arc approximating the bottom of the grooves, the virtual radius thereof can easily be found. These virtual radii of the virtual arcs are important indications for taking hold of the wear situation of the tire. In addition, the distance data also include a two-dimensional shape measured by the line laser shape sensor.

Further, in the present application, the tire surface includes the groove side surface, the groove bottom, and the surface of the side part as well as the tread surface.

BRIEF DESCRIPTION OF THE DRAWINGS

FIG. 1 is a schematic cross-sectional view showing the measurement state of a conventional apparatus for measuring a shape of a tire.

FIG. 2 is a schematic cross-sectional view showing the measurement state of the conventional apparatus for measuring a shape of a tire.

FIG. 3 is a schematic perspective view showing the apparatus for measuring a shape of a tire related to the present invention.

FIG. 4 is a schematic cross-sectional view showing the state in which the scanning part is fixed.

FIG. 5 is a schematic view showing the periphery of the optical sensor.

FIG. 6 is a cross-sectional view showing the measurement state of the side part of the tire.

FIG. 7 is a view showing the method of attaching the apparatus for measuring a shape of a tire related to the present invention.

DESCRIPTION OF THE PREFERRED EMBODIMENTS

Hereinafter, the embodiments of the apparatus for measuring a shape of a tire of the present invention are explained using figures. FIG. 3 is a perspective view showing the apparatus for measuring a shape of a tire. Supporting portions of the scanning part 1a and 1b are supported by a contacting plate 2 at one end and by a connecting plate 4 at the other end so that they are parallel to each other with a space therebetween. The contacting plate 3 and the connecting plate 4 are connected by a screw (not illustrated). By turning a lever 5 that is directly connected to said screw, the contacting plate 3 can move in the longitudinal direction of the supporting portions of the scanning part 1a and 1b. The scanning part 6 measures the distance to the tread surface or the groove surface while scanning the optical sensor (not illustrated).

Both side parts of the tire to be measured are sandwiched by the contacting plates 2 and 3 and the supporting portions of the scanning part 1a and 1b are supported upward of the tire tread. With this state, first, the scanning part for positioning 7 is inserted. A line laser light generator (not illustrated) built in the scanning part for positioning 7 irradiates line laser light to the same position of the trajectory that the optical sensor of the scanning part 6 scans. Therefore, adjusting the position of the supporting portions of the scanning part so as to scan intended position of the optical sensor of the scanning part 6 is available. Further, when a level is provided with the supporting portions of the scanning part 1a and 1b, fine adjustment for the optical sensor to scan parallel to the tire rotational axis can easily be made. For information, as a line laser light generator, the one with the model number of MLXK-D13-660 manufactured by Kikoh Giken Co., Ltd. can be used.

In addition, in order to fix the scanning part for positioning 7 with high precision, a concave dovetail groove 11 is formed on the supporting portions of the scanning part 1a and 1b, and convex dovetail grooves 12 are formed on the scanning part 6 and the scanning part for positioning 7, respectively. Further, the structure may include biasing the contacting part 3 with a spring. Moreover, the supporting portions of the scanning part may be integrated into one to make the scanning part 6 and scanning part for positioning 7 detachable.

As shown by the dotted line D1 in FIG. 7, to attach to the tire T, the supporting portions of the scanning part 1a and 1b can be directly inserted in the space between the fender 210 and the tire T of the vehicle V. And when the space 211 is narrow, as shown in one dotted chain line D2, the supporting portions of the scanning part 1a and 1b can be attached along the tire T.

FIG. 4 is a schematic cross-sectional view showing the state in which the scanning part 6 is fixed by the supporting portions of the scanning part 1a and 1b. The contacting plate 2 contacts with one side part 201 of the tire. The contacting plate 3 is movable in the longitudinal direction of the supporting portions of the scanning part 1a and 1b by the connecting part 4 by the screw 8 directly connected to the lever 5. Therefore, by the contacting plates 2 and 3, the scanning part 6 is fixed in the state of sandwiching both side parts 201 of the tire T. For information, usually, the scanning part 6 is fixed upward of the tread surface that is symmetrical to the grounding surface of the tire T in regard to the rotational axis. As a result, since a person who measures does not have to hold the apparatus during the measurement by hand, there is no degradation in the measuring precision by shaking. Since the scanning part 6 does not contact with the tread 203, no failure caused by raindrops or foreign materials adhered to the tread 203 occurs, either. Further, since the optical sensor 11 is so adjusted to scan parallel to the rotational axis of the tire T, positional deviation of the scanning part 6 can be prevented.

The optical sensor 11 is movable in the longitudinal direction (the width direction of the tire T) of the scanning part 6 along with the guide 12. The optical sensor is provided with a laser distance measuring apparatus 13 and a mirror 14. Although the laser light 21 emitted from the laser distance measuring apparatus 13 is parallel to the tread 203, the light is refracted by the mirror 14 and vertically radiated to the tread 203 and the groove bottom. By this, the distance from the laser distance measuring apparatus 13 to the tread 203 and the groove 202 can be precisely measured. For information, as the laser distance measuring apparatus, model number: ZX-LD100 manufactured by OMRON Corporation can be used.

Since the distance from the laser distance measuring apparatus 13 to the mirror 14 is constant, when scanned by the optical sensor 11 in the width direction of the tire T, the distance from the virtual line that is parallel to the rotational axis of the tire T to the tread 203 or to the groove 202 can be measured. For information, the reason that the laser light is refracted by the mirror 14 is for inserting the scanning part 6 in the narrow gap between the fender 210 of the vehicle V and the tire T by making the scanning part 6 thin.

Scanning by the optical sensor 11 can be made by publicly known methods. For example, the structure shown in FIG. 5 is available. FIG. 5 is a schematic view showing the periphery of the optical sensor and shows the surface opposing to the tire T of the scanning part 6. The optical sensor 11 is connected to the belt 16. The belt 16 is driven by a gear and a motor (both not illustrated) provided at both ends of the scanning part 6. As a result, guided by the guide 12, scanning by the optical sensor 11 is made in the width direction of the tire T.

It is preferable that the scanning part 6 is provided with positional data of the optical sensor 11 and communication means that send the data of the distance to the tire T at the position. The transmitted data can be processed by the computer. For example, by calculating the virtual circular arc A1 approximating the surface of the tread 203 and calculating the virtual circular arc A2 approximating the bottom of the grooves 202 shown in FIG. 4, the virtual radius thereof can easily be found. For information, the positional data of the optical sensor 11 can be obtained by a rotary encoder that is connected to the gear and the motor that drive the belt 16, and the communication means may be publicly known ones such as RS232C, and the like.

Instead of using the distance measuring apparatus 13, a line laser shape sensor (for example, model number: Z500, manufactured by OMRON Corporation, not illustrated) can be used as well. In this case, the direction of incident and exit line laser light is set to be parallel to the tread 203 and refracted by a mirror to be vertical to the tread 230, and the line laser parallel to the tire circumferential direction can be irradiated. By measuring two-dimensional shape of the length corresponding to the line and by scanning the line laser shape sensor in the tire width direction, three-dimensional shape of the tread can be measured.

FIG. 6 is a cross-sectional view showing the measurement state of the side part of the tire. With the contacting plate 2 grounded, the scanning direction of the optical sensor 11 is set to be vertical. By this, deflection shape at the side part 201 of the tire T can also be measured.

In addition, for wide tires (for example, tires with 630 mm wide) called super single, it is possible that the parts except for the scanning parts 6 are manufactured as the ones for wide tires and measuring of the scanning parts 6 for ordinary tires (for example, tires with up to 300 mm wide) is made dividing it into several times. Therefore, the scanning parts 6 for wide tires need not be manufactured and can keep the apparatus cost low.

What is claimed is:

1. An apparatus for measuring a shape of a tire comprising a scanning part provided with an optical sensor that is arranged to measure the distance to the tire surface and a driving part in which said optical sensor is arranged to scan in the tire width direction, supporting portions of the scanning part that support said scanning part,
a contact plate provided at one end of said supporting portions of the scanning part, and a contact plate provided at the other end of said supporting portion of the scanning part and movable in said scanning direction, wherein said scanning part is detachable to the supporting portion of the scanning part.

2. The apparatus for measuring a shape of a tire as set forth in claim 1, further provided with the detachable scanning part for positioning in said supporting portions of the scanning part.

3. The apparatus for measuring a shape of a tire as set forth in claim 1, wherein said optical sensor includes a laser distance measuring apparatus and a mirror, the direction of the incident and exit laser light of a laser distance measuring apparatus is parallel to the tire tread to be measured, and said line laser light is refracted by said mirror to be vertical to said tread.

4. The apparatus for measuring a shape of a tire as set forth in claim 2, wherein said optical sensor includes a laser distance measuring apparatus and a mirror, the direction of the incident and exit line laser light of a laser distance measuring apparatus is parallel to the tire tread to be measured, and said line laser light is refracted by said mirror to be vertical to said tread.

5. The apparatus for measuring a shape of a tire as set forth in claim 1, wherein said optical sensor includes a line laser shape sensor and a mirror, the direction of the incident and exit line laser of said line laser shape sensor is parallel to the tire tread to be measured, and said line laser light is refracted by said mirror to be vertical to said tread.

6. The apparatus for measuring a shape of a tire as set forth in claim 2, wherein said optical sensor includes a line laser shape sensor and a mirror, the direction of the incident and exit line laser of said line laser shape sensor is parallel to the tire tread to be measured, and said line laser light is refracted by said mirror to be vertical to said tread.

7. The apparatus for measuring a shape of a tire as set forth in claim 1 further provided with communication means that is arranged to transmit the positional data of said optical sensor and the data of the distance to the tire surface.

8. The apparatus for measuring a shape of a tire as set forth in claim 2 further provided with communication means that is arranged to transmit the positional data of said optical sensor and the data of the distance to the tire surface.

9. The apparatus for measuring a shape of a tire as set forth in claim 3 further provided with communication means that is arranged to transmit the positional data of said optical sensor and the data of the distance to the tire surface.

10. The apparatus for measuring a shape of a tire as set forth in claim 4 further provided with communication means that is arranged to transmit the positional data of said optical sensor and the data of the distance to the tire surface.

11. The apparatus for measuring a shape of a tire as set forth in claim 5 further provided with communication means that is arranged to transmit the positional data of said optical sensor and the data of the distance to the tire surface.

12. The apparatus for measuring a shape of a tire as set forth in claim 6 further provided with communication means that is arranged to transmit the positional data of said optical sensor and the data of the distance to the tire surface.

* * * * *